United States Patent
Hozumi (10) Patent No.: US 12,125,177 B2
(45) Date of Patent: Oct. 22, 2024

(54) INFORMATION PROCESSING APPARATUS, CONTROL METHOD OF INFORMATION PROCESSING APPARATUS, AND NON-TRANSITORY COMPUTER READABLE MEDIUM FOR USE IN MIXED REALITY

(71) Applicant: CANON KABUSHIKI KAISHA, Tokyo (JP)

(72) Inventor: Yasushi Hozumi, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 107 days.

(21) Appl. No.: 18/061,515

(22) Filed: Dec. 5, 2022

(65) Prior Publication Data
US 2023/0196517 A1    Jun. 22, 2023

(30) Foreign Application Priority Data

Dec. 16, 2021  (JP) .................................. 2021-204056

(51) Int. Cl.
*G06T 5/70*    (2024.01)
*G02B 27/01*   (2006.01)
*G06T 11/00*   (2006.01)

(52) U.S. Cl.
CPC ............ *G06T 5/70* (2024.01); *G02B 27/0101* (2013.01); *G06T 11/00* (2013.01); *G06T 2207/20192* (2013.01)

(58) Field of Classification Search
None
See application file for complete search history.

(56) References Cited

U.S. PATENT DOCUMENTS

| | | | |
|---|---|---|---|
| 10,489,683 B1* | 11/2019 | Koh ...................... | G06F 18/213 |
| 2011/0292210 A1* | 12/2011 | Mizutani ................ | H04N 25/60 |
| | | | 348/148 |
| 2013/0257908 A1* | 10/2013 | Ota ........................ | G06T 19/006 |
| | | | 345/633 |
| 2018/0012411 A1* | 1/2018 | Richey ................... | G06T 19/006 |
| 2020/0302681 A1* | 9/2020 | Totty ..................... | G06T 15/205 |

(Continued)

FOREIGN PATENT DOCUMENTS

| | | |
|---|---|---|
| CN | 111612915 A | 9/2020 |
| GB | 2473263 A | 3/2011 |
| JP | 2002-010060 A | 1/2002 |

(Continued)

OTHER PUBLICATIONS

Combined Search and Examination Report issued in GB Patent Application No. 2217128.4, dated May 18, 2023, pp. 1-6.

*Primary Examiner* — Jason A Pringle-Parker
(74) *Attorney, Agent, or Firm* — Carter, DeLuca & Farrell LLP (57) ABSTRACT

An information processing apparatus according to the present invention includes at least one memory and at least one processor which function as: a generating unit configured to generate an image of a virtual space that is superimposed on an image of a real space captured by an image sensor; and an adding unit configured to add noise to the image of the virtual space, wherein the image sensor includes a region for capturing an image of the real space and a light-shielding region, and the adding unit adds noise to the image of the virtual space, based on an image acquired in the light-shielding region.

9 Claims, 6 Drawing Sheets

(56) References Cited

U.S. PATENT DOCUMENTS

2021/0023331 A1     7/2021  Manser
2021/0233316 A1*    7/2021  Manser .................... G06T 5/92

FOREIGN PATENT DOCUMENTS

| JP | 2014203326 A | 10/2014 |
| JP | 2019114135 A | 7/2019 |
| JP | 2021056963 A | 4/2021 |

* cited by examiner

INFORMATION PROCESSING APPARATUS, CONTROL METHOD OF INFORMATION PROCESSING APPARATUS, AND NON-TRANSITORY COMPUTER READABLE MEDIUM FOR USE IN MIXED REALITY

BACKGROUND OF THE INVENTION

Field of the Invention

The present invention relates to an information processing apparatus, control method of the information processing apparatus, and a non-transitory computer readable medium, for use in mixed reality.

Description of the Related Art

As a technique related to a mixed reality (MR) aiming at blending a real space and a virtual space seamlessly, an MR system using a video see-through type head mounted display (HMD) is known. In this system, an image of computer graphics (CG) generated in accordance with the positional orientation of an imaging apparatus is superimposed on a real space image captured by such an imaging apparatus as a video camera, and this image is viewed via such a display device as a display of HMD.

In the MR system using the video see-through type HMD, if a real space image and a CG image are superimposed and displayed without being modified, the image tends to be visually unnatural. This is because characteristics related to image quality, e.g. gradation characteristics, white balance, sense of noise, resolution, are different between the real space image and the CG image.

Figure 9:
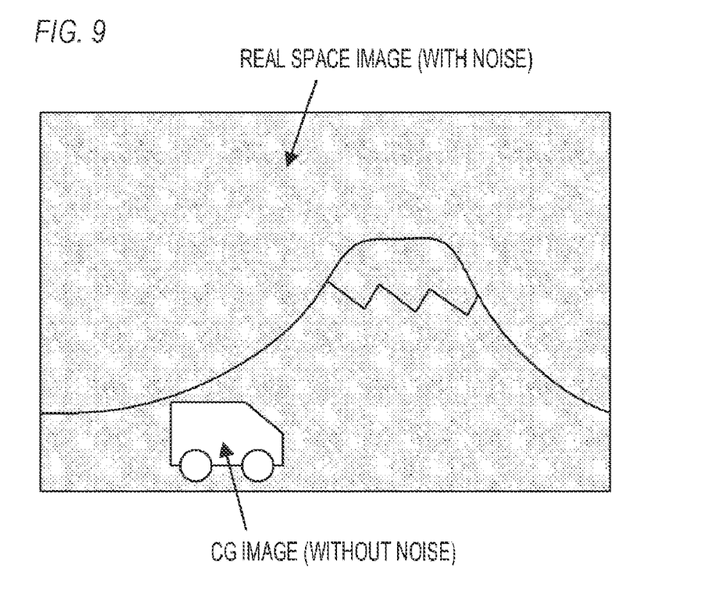
FIG. 9 is a diagram depicting an example of a mixed reality image having an unnatural sense.

For example, it is assumed that a real space image and a CG image having different sense of noise (e.g. a real space image having noise and a CG image not having noise) are superimposed and displayed without being modified. In this case, as illustrated in FIG. 9, an image having an unnatural sense of noise is displayed, since the sense of noise is different between the CG image and the real space image around the CG image. A technique to reduce such an unnatural sense (an unnatural sense of noise when the real space image and the CG image are superimposed and displayed) is disclosed in Japanese Patent Application Publication No. 2014-203326.

However, in a prior art, such as the technique disclosed in Japanese Patent Application Publication No. 2014-203326, noise is added to the vertical space image (image in virtual space: CG image) at a predetermined fixed standard. Therefore, in the prior art, a virtual space image, of which sense of noise is different from that of the real space image (image in the real space), is generated, and in some cases, an image having an unnatural sense of noise may be acquired as an image created when the virtual space image is superimposed on the real space image.

SUMMARY OF THE INVENTION

The present invention provides a technique to generate an image of a virtual space having a sense of noise matching with that of an image of a real space, and to acquire an image having no unnatural sense of noise as an image created when an image of a virtual space is superimposed on an image of a real space.

The present invention in its first aspect provides an information processing apparatus including at least one memory and at least one processor which function as: a generating unit configured to generate an image of a virtual space that is superimposed on an image of a real space captured by an image sensor; and an adding unit configured to add noise to the image of the virtual space, wherein the image sensor includes a region for capturing an image of the real space and a light-shielding region, and the adding unit adds noise to the image of the virtual space, based on an image acquired in the light-shielding region.

The present invention in its second aspect provides a control method of an information processing apparatus, including: generating an image of a virtual space that is superimposed on an image of a real space captured by an image sensor; and adding noise to the image of the virtual space, wherein the image sensor includes a region for capturing an image of the real space and a light-shielding region, and noise is added to the image of the virtual space, based on an image acquired in the light-shielding region.

The present invention in its third aspect provides a head mounted display including: the information processing apparatus; and a display configured to superimpose an image of a virtual space, to which noise is added by the adding unit, on an image of a real space, and to display.

The present invention in its fourth aspect provides a non-transitory computer readable medium that stores a program, wherein the program causes a computer to execute a control method of an information processing apparatus, the control method comprising: generating an image of a virtual space that is superimposed on an image of a real space captured by an image sensor; and adding noise to the image of the virtual space, wherein the image sensor includes a region for capturing an image of the real space and a light-shielding region, and noise is added to the image of the virtual space, based on an image acquired in the light-shielding region.

Further features of the present invention will become apparent from the following description of embodiments with reference to the attached drawings.

DESCRIPTION OF THE EMBODIMENTS

Embodiments of the present invention will be described in detail with reference to the accompanying drawings. Each of the embodiments of the present invention described below can be implemented solely or as a combination of a plurality of the embodiments or features thereof where necessary or where the combination of elements or features from individual embodiments in a single embodiment is beneficial.

In a case where a virtual space image (image of a virtual space) is directly superimposed on a real space image (image of a real space) having a different sense of noise, an image having an unnatural sense of noise is acquired. As a technique to reduce such an unnatural sense, a technique to add noise to the virtual space image at a predetermined fixed standard has been proposed.

A noise characteristic of an imaging unit that captures a real space image, however, has an individual difference, hence the sense of noise (noise characteristic) of the real space image varies among a plurality of image apparatuses. Further, the sense of noise of the real space image can be changed by performing image processing on the real space image, but the image processing performed on the real space image is not always the same among the plurality of imaging apparatuses. The sense of noise of the real space image varies among the plurality of imaging apparatuses for this reason as well. Therefore, in a prior art, a virtual space image having a different sense of noise from that of the real space image (image of a real space) may be generated, and an image having an unnatural sense of noise may be acquired when the virtual space image is superimposed on the real space image.

With the foregoing in view, in the following embodiments, noise is added to the virtual space image, considering the noise characteristic that is unique to the imaging unit, imaging processing performed on the real space image, and the like. Thereby an image of the virtual space having the sense of noise matching with that of the image of the real space can be generated, and as a result, an image having no unnatural sense of noise can be acquired when the image of the virtual space is superimposed on the image of the real space.

Embodiment 1

Figure 1:
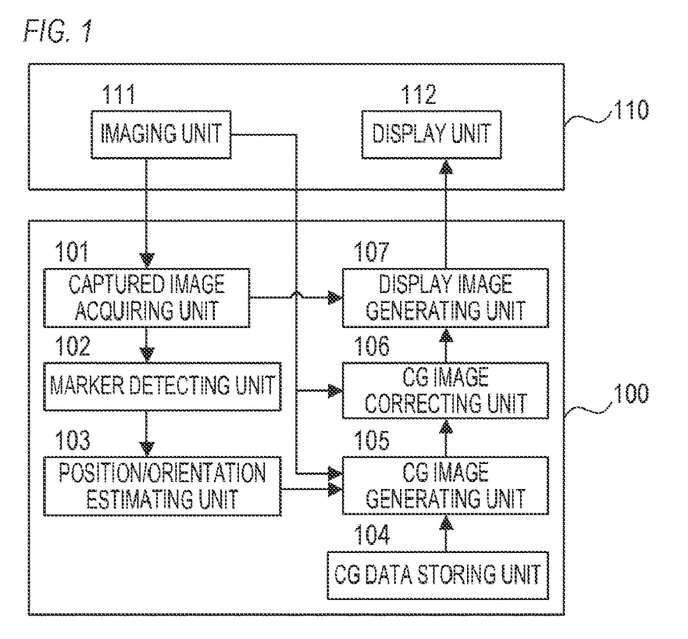
FIG. 1 is a diagram depicting a configuration example of an MR system according to Embodiment 1.

Embodiment 1 of the present invention will be described. FIG. 1 is a block diagram depicting a configuration example of a mixed reality (MR) system, which is an information processing system according to Embodiment 1. The MR system indicated in FIG. 1 is an MR system using a video see-through type head mounted display (HMD). The MR system in FIG. 1 generates a mixed reality image by superimposing a computer graphics (CG) image, which is a virtual space image generated in accordance with the position/orientation of an imaging apparatus (e.g. video camera), on a real space image captured by the imaging apparatus, and displays this mixed reality image on an HMD, so as to provide this mixed reality image to the user. The display of the mixed reality image is a superimposed display of the real space image and the CG image.

As indicated in FIG. 1, the MR system of Embodiment 1 includes an information processing apparatus 100 and an HMD 110. The configuration indicated in FIG. 1 is an example, and a part or all of the functions of the information processing apparatus 100 may be included in the HMD 110, for example.

The HMD 110 is a video see-through type HMD, and includes an imaging unit 111 and a display unit 112. The imaging unit 111 images a real space, acquires a real space image, and sends this real space image to the information processing apparatus 100. The real space image may be sent from the imaging unit 111 to the information processing apparatus 100 via cable communication or via wireless communication. The display unit 112 is a display or the like to display an image, and displays the display image received from the information processing apparatus 100, for example.

Figure 2:
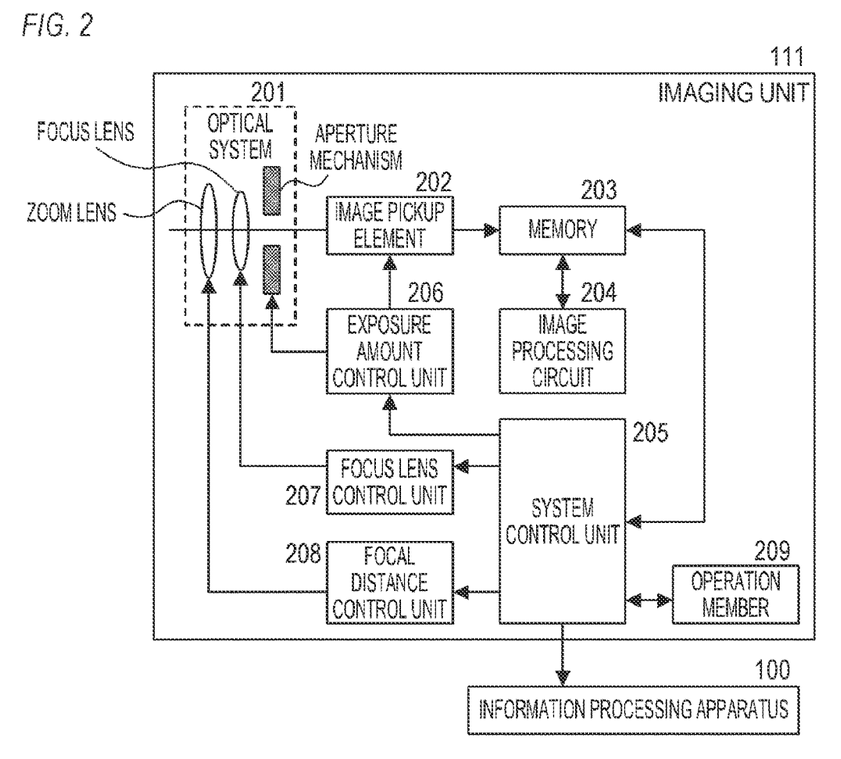
FIG. 2 is a diagram depicting a configuration example of an imaging unit according to Embodiment 1.

FIG. 2 is a block diagram depicting a configuration example of the imaging unit 111.

An optical system 201 is an optical system that includes a plurality of lenses and an aperture mechanism, and specifically includes a focus lens used for focusing, a zoom lens for zooming, and the aperture mechanism.

An image pickup element 202 is an image sensor, such as CCD and CMOS, and includes an A/D convertor that converts an analog signal into a digital signal. On a surface of the image pickup element 202, RGB color filters in a Bayer array are formed, for example, so that color images can be captured. When an object image is formed on an imaging surface of the image pickup element 202, the image pickup element 202 generates image data (image signal) and outputs the image data. The image data outputted from the image pickup element 202 is stored in the memory 203.

In Embodiment 1, the imaging surface of the image pickup element 202 includes a region for capturing a real space image (image region: region where the above mentioned object image is formed), and a region that is optically shielded (light-shielding region: optical black (OB) region). From the image pickup element 202, the image data of the image region (data of real space image) and the image data of the OB region are outputted. The image data of the OB region is data of a black image, and is outputted as image data which indicates a pixel value having a lowest brightness.

The image data of the OB region mixes noise having a characteristic unique to the imaging unit 111 (e.g. noise generated in the image pickup element 202 or peripheral electric circuits thereof). Therefore, the image data of the OB region actually indicates not the pixel value (fixed value) of the lowest brightness, but the pixel value that varies depending on the noise. Further, the variation of the pixel values (e.g. standard deviation) among all the pixels of a predetermined region, which is set to at least a part of the OB region, can be measured as the noise amount of the frame image of the real space image (that is, dark noise amount).

Therefore in Embodiment 1, the noise having a characteristic unique to the imaging unit 111 (noise of each frame image of the real space image) is estimated based on the imaging result of the OB region, and the noise based on this estimation result is added to the CG image. Specifically, the noise amount of the OB region (noise measurement region) is measured, and the noise based on the noise amount measurement result (result of measuring the noise amount) is added to the CG image. Thereby noise equivalent to that of the real space image, having a characteristic based on the characteristic unique to the imaging unit 111, can be added to the CG image. The noise amount may be constantly measured (e.g. for each frame of the real space image), or may be periodically measured (e.g. for each plurality of frames of the real space image).

A memory 203 can store image data outputted from the image pickup element 202, data required for the imaging unit 111 to perform processing in general, and the like. The memory 203 can also hold the above mentioned noise amount measurement result, and the later mentioned image processing setting information.

An image processing circuit 204 performs a predetermined image processing (e.g. pixel interpolation processing, color conversion processing) on image data (real space image) held in the memory 203. The image processing circuit 204 may also perform predetermined arithmetic processing using the captured image data, determine the image capturing conditions based on the acquired arithmetic result, and notify the determined image capturing conditions to the system control unit 205. The image processing circuit 204 can performs analysis of an image, filter processing, noise reduction processing, edge enhancement processing, contrast adjustment processing, combining processing, and the like. For example, after reading the result of measuring the noise amount of the OB region from the memory 203, the image processing circuit 204 performs noise reduction processing matching with the noise characteristic of the real space image based on the noise amount measurement result.

The user can select image processing to be performed by the image processing circuit 204 and the intensity thereof, and can acquire the real space image having the desired image quality. As mentioned above, the noise characteristic of the real space image changes depending on the image processing performed by the image processing circuit 204.

Therefore in Embodiment 1, noise is added to the CG image using the characteristic based on the image processing performed by the image processing circuit 204. The characteristic based on the image processing is a characteristic based on the image processing setting, such as the noise reduction setting, edge enhancement setting and contrast adjustment setting. Thereby a noise equivalent to that of the real space image after the image processing can be added to the CG image.

The image processing circuit 204 can perform digital zoom. Unlike optical zoom which controls a zoom lens of the optical system 201, digital zoon is image processing to acquire a zoomed image without controlling the zoom lens, and is the magnifying processing using the bi-cubic method, image trimming, and the like, for example. Therefore, the size of the particles of noise changes depending on the digital zoom magnification (magnification of digital zoom). The digital zoom magnification can also be suitably changed by selecting a function.

In Embodiment 1, noise is generated considering the digital zoom magnification, and is added to the CG image. For example, noise is magnified at a same magnification as the digital zoom magnification, and is added to the CG image.

The system control unit 205 controls the imaging unit 111 in general. The system control unit 205 outputs instructions to control the shutter speed, the aperture mechanism, the focus lens and the zoom lens, in order to capture images under the image capturing conditions determined by the image processing circuit 204. Specifically, the system control unit 205 outputs the instructions to an exposure amount control unit 206, a focus lens control unit 207 and a focal distance control unit 208.

The system control unit 205 can also read the image data of the OB region from the memory 203, measure the noise amount of the OB region, and store the noise amount measurement result in the memory 203. Further, the system control unit 205 can change the image processing setting (including digital zoom magnification setting) of the image processing circuit 204 based on the user operation. Furthermore, the system control unit 205 can read the noise amount measurement result from the memory 203, read the image processing setting information (information related to image processing setting) from the image processing circuit 204, and notify these types of information to a CG image correcting unit 106 (described later).

The exposure amount control unit 206 adjusts the aperture mechanism of the optical system 201, the exposure time of the image pickup element 202, and the imaging sensitivity (that is, ISO sensitivity), and performs appropriate exposure amount control.

The focus lens control unit 207 controls the focus lens of the optical system 201.

The focal distance control unit 208 changes the focal distance by controlling the zoom lens of the optical system 201 in accordance with the instruction from the system control unit 205.

An operation member 209 is buttons, a touch panel, or the like, and receives the user operation, such as the image capturing instruction and the image processing setting change instruction. In accordance with the user operation received from the operation member 209, the system control unit 205 determines or changes the operation of the imaging unit 111. The touch panel may be integrated with the display unit 112.

In FIG. 1, the information processing apparatus 100 includes a captured image acquiring unit 101, a marker detecting unit 102, a position/orientation estimating unit 103, a CG data storing unit 104, a CG image generating unit 105, the CG image correcting unit 106, and a display image generating unit 107.

The captured image acquiring unit 101 acquires a real space image captured by the imaging unit 111 of the HMD 110, and sends the acquired real space image to the marker detecting unit 102 and the display image generating unit 107.

Figure 3:
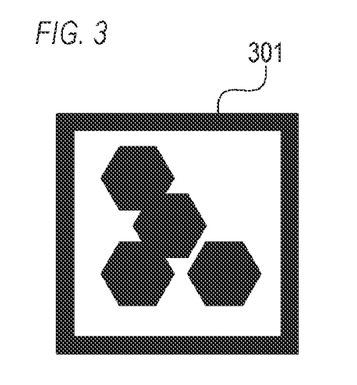
FIG. 3 is a diagram depicting an example of a marker according to Embodiment 1.

The marker detecting unit 102 specifies a location where a marker (two-dimensional code) used for estimating the position/orientation of the HMD 110 (imaging apparatus) is imaged in the acquired real space image. The marker is a black code written on a white background, as indicated in 301 in FIG. 3. The marker detecting unit 102 sends the information on the position, orientation, and the like, of the detected marker 301 (marker location information) to the position/orientation estimating unit 103 along with the real space image.

The position/orientation estimating unit 103 determines the position/orientation of the HMD 110 based on the marker location information detected by the marker detecting unit 102 and the real space image. Various research reports have been released concerning the methods for estimating the position/orientation, and any one of these methods may be used. In order to increase the accuracy of the position/orientation information, a magnetic type sensor, an optical type sensor, or the like, may also be used. The position/orientation estimating unit 103 sends the determined position/orientation information to the CG image generating unit 105.

The CG image generating unit 105 acquires the CG data from the CG data storing unit 104, performs such processing as moving, rotation and magnification/demagnification, and generates a CG image, which is an image to be superimposed on the real space image, and is an image of the virtual space viewed from the HMD 110. Further, in the CG image generation processing, the CG image generating unit 105 reads, from the memory 203, not only the position/orientation information acquired from the position/orientation estimating unit 103, but also a principal point position, focal distance information, and the like, stored in advance, via the system control unit 205 of the imaging unit 111. The CG image generating unit 105 sends the generated CG image to the CG image correcting unit 106.

The CG image correcting unit 106 generates noise based on the information related to the noise of the real space image notified by the system control unit 205 of the imaging unit 111, and adds the noise to the CG image. The information related to noise includes the result of measuring the noise amount of the OB region, and the information on the image processing setting based on the user operation (user instruction).

The MR system according to Embodiment 1 reduces the unnatural sense generated when the real space image and the CG image (virtual space image) are superimposed and displayed, by the CG image correcting unit 106 adding noise to the CG image so as to match the CG image with the real space image. The CG image correcting unit 106 sends the corrected CG image to the display image generating unit 107.

The display image generating unit 107 superimposes the CG image (CG image after the noise is added) acquired from the CG image correcting unit 106, to the real space image acquired from the captured image acquiring unit 101, whereby a mixed reality image, constituted of the real space image and the CG image, is generated as a display image. The display image generating unit 107 sends the generated mixed reality image to the display unit 112 of the HMD 110.

Figure 4:
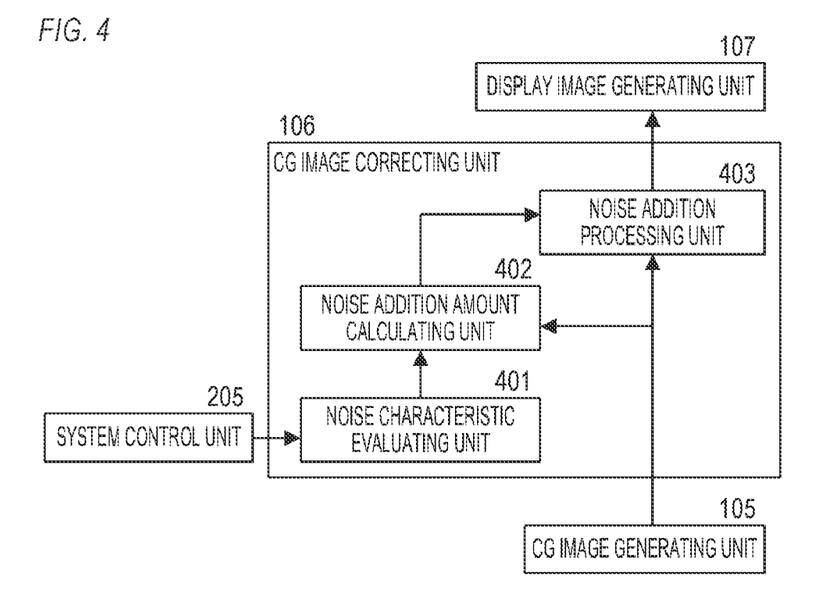
FIG. 4 is a diagram depicting a configuration example of a CG image correcting unit according to Embodiments 1 and 2.

FIG. 4 is a block diagram depicting a configuration example of the CG image correcting unit 106. The CG image correcting unit 106 includes a noise characteristic evaluating unit 401, a noise addition amount calculating unit 402, and a noise addition processing unit 403.

Figure 5:
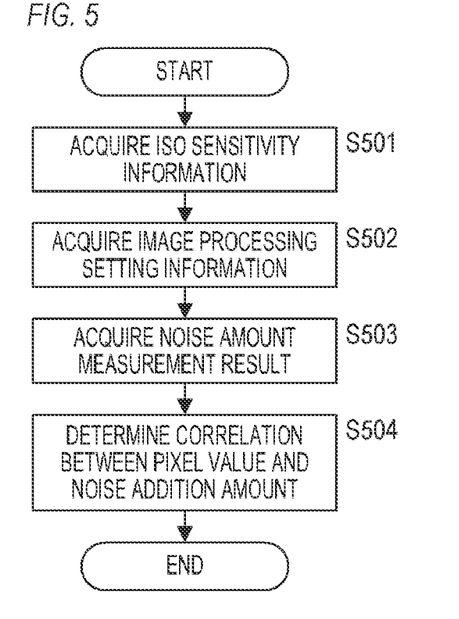
FIG. 5 is a flow chart depicting an operation example of a noise characteristic evaluating unit according to Embodiments 1 and 2.

The noise characteristic evaluating unit 401 acquires information related to noise from the system control unit 205 of the imaging unit 111, and determines the correlation (correspondence) between a pixel value of the CG image and a noise amount to be attached to the pixel value based on this information. FIG. 5 is a flow chart depicting an example of an operation of the noise characteristic evaluating unit 401 (operation to determine the correlation).

In S501 in FIG. 5, the noise characteristic evaluating unit 401 acquires the information on the imaging sensitivity (ISO sensitivity) which is set in the image pickup element 202, from the memory 203 via the system control unit 205. The ISO sensitivity information is also one information related to the noise. Generally, as the numeric value of the ISO sensitivity increases, the light-receiving sensitivity of the image pickup element 202 improves and weak light can be detected, but the amount of noise superimposed on the captured image data increases (worsens).

In S502, the noise characteristic evaluating unit 401 acquires information on the current image processing setting in the image processing circuit 204 from the image processing circuit 204 via the system control unit 205. For example, the image processing setting information includes the setting information on the level (strong/weak) of noise reduction. The image processing setting information is information related to the noise characteristic, and may include setting information on the level (strong/weak) of edge enhancement and contrast adjustment, for example. The image processing setting information may include only one type of information, or may include a plurality of types of information. The image processing setting information may include setting information of digital zoom magnification. The image processing setting information may include information other than the information indicating the image processing setting. Depending on the image processing performed by the image processing circuit 204, the temperature of the imaging unit 111 (temperature of the image pickup element 202) changes, and the noise characteristic unique to the imaging unit 111 (noise characteristic of the image pickup element 202) also changes. Therefore, the image processing setting information may include the temperature information of the imaging unit 111. If the temperature information of the imaging unit 111 is used, the current noise amount can be estimated from the noise amount of the OB region measured in the past, for example.

In S503, the noise characteristic evaluating unit 401 acquires the result of measuring the noise amount of the OB region from the memory 203 via the system control unit 205.

In S504, the noise characteristic evaluating unit 401 determines the correlation between the pixel value of the CG image and the noise amount to be added to this pixel value (noise addition amount) based on the three types of information acquired in S501 to S503.

In Embodiment 1, the correlation between the pixel value and the noise addition amount is determined based on the above mentioned three types of information, but the present invention is not limited thereto. For example, the correlation may be determined without using one of the image processing setting information acquired in S502 and the noise amount measurement result acquired in S503. In a case where the individual difference of the noise characteristic of the image pickup element 202 is small within a predetermined ISO sensitivity range, only the image processing setting information may be acquired to determine the correlation. Further, in a case where the ISO sensitivity setting and the image processing setting are predetermined settings (e.g. the ISO sensitivity setting and the image processing setting are fixed (cannot be changed)), only the noise amount measurement result may be acquired to determine the correlation.

Figure 6A:
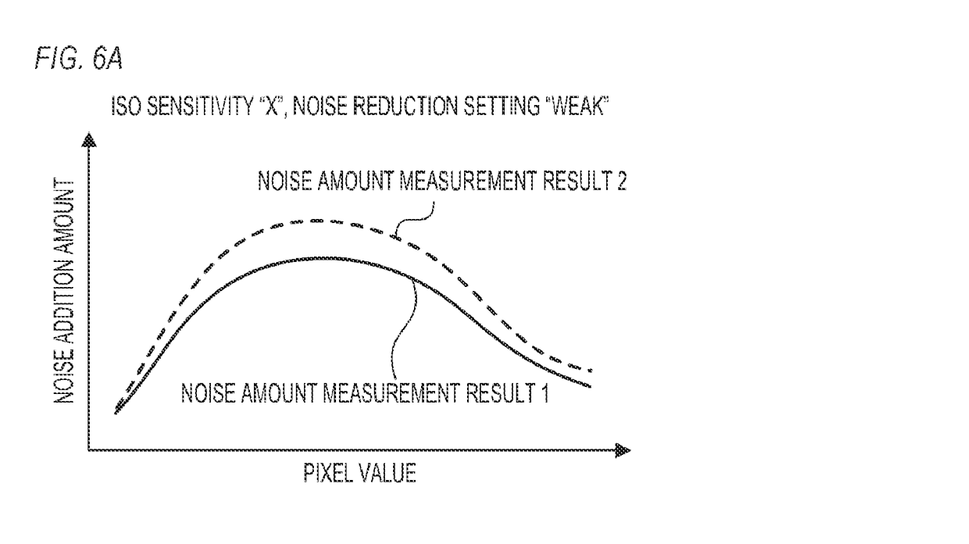
FIGS. 6A and 6B are diagrams depicting an example of a correlation between a pixel value and a noise addition amount according to Embodiment 1.
Figure 6B:
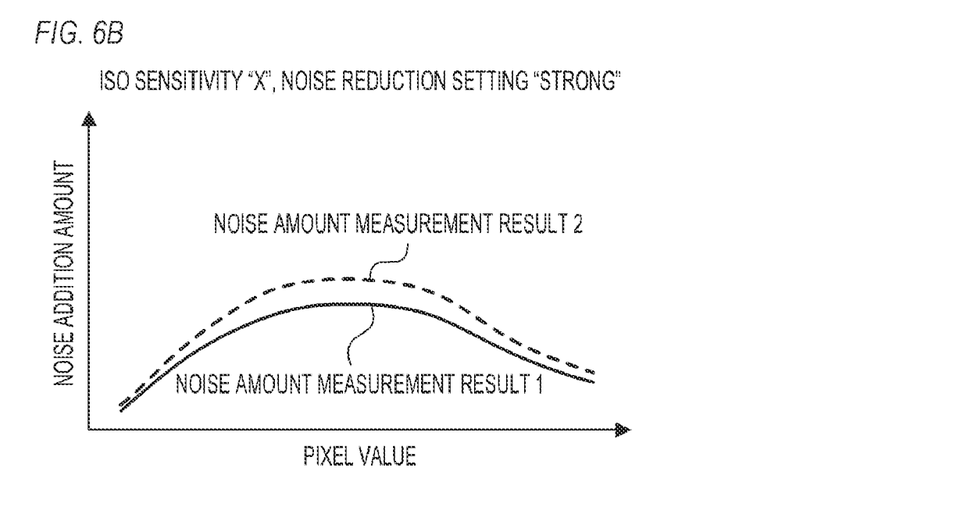

FIGS. 6A and 6B indicate an example of the correlation determined in S504. FIG. 6A is a correlation graph indicating the correlation between the pixel value of the CG image and the noise addition amount of a CG image, in a case where the ISO sensitivity is "X" and the noise reduction setting is "weak". FIG. 6B is a correlation graph indicating the correlation between the pixel value of the CG image and the noise addition amount of a CG image, in a case where the ISO sensitivity is "X" and the noise reduction setting is "strong". In FIGS. 6A and 6B, the solid line indicates the correlation in the case of "noise amount measurement result 1", and the broken line indicate the correlation in the case of "noise amount measurement result 2".

For example, when the operation in FIG. 5 is executed in an image capturing scene, it is assumed that the information of the ISO sensitivity "X" is acquired in S501, the information of the noise reduction setting "weak" is acquired in S502, and the information of the "noise amount measurement result 1" is acquired in S503. In this case, in S504, the correlation indicated by the solid line of FIG. 6A is determined, and the information of this correlation is sent to the noise addition amount calculating unit 402.

In Embodiment 1, the information on a plurality of correlations, corresponding to a plurality of combinations of the ISO sensitivity, the image processing setting information and the noise amount measurement result are stored in a memory (not illustrated) of the noise characteristic evaluating unit 401. Here the information of the correlations is assumed to be information (table) which indicates the correlations in a table format. The information of the correlations can be generated based on the imaging result indicated in a predetermined chart image or the like. In S504, the noise characteristic evaluating unit 401 selects and acquires information of a correlation corresponding to the combination of the three types of information acquired in S501 to S503, out of the information of a plurality of correlations stored in the memory.

Instead of determining the correlation, the noise addition amount may be calculated using a function f (N, ISO, X, Y). The function f (N, ISO, X, Y) is a predetermined function, of which input is "N", "ISO", "X" and "Y", and output is the noise addition amount. One or two of "N", "ISO" and "X" may be eliminated from input. The function f (N, ISO, X, Y) is expressed as follows, for example.

$$f(N,ISO,X,Y)=a(N)\times b(ISO)\times c(X)\times f_0(Y)$$

N: noise amount measurement result
ISO: ISO sensitivity
X: image processing setting information (parameter related to image processing)
Y: pixel value of CG image
$f_0$ (Y): reference function to calculate noise addition amount
a (N): function to calculate the weight in accordance with the noise amount measurement result (weighting coefficient with respect to $f_0$ (Y))
b (ISO): function to calculate the weight in accordance with the ISO sensitivity (weighting coefficient with respect to $f_0$ (Y))
c (X): function to calculate the weight in accordance with the image processing setting information (weighting coefficient with respect to $f_0$ (Y))

The reference function $f_0(Y)$ indicates the correlation corresponding to the combination of the predetermined ISO sensitivity (e.g. ISO 100), the predetermined image processing setting information (e.g. noise reduction setting "weak"), and the predetermined noise amount (e.g. noise amount of OB region of a common image pickup element). The functions a (N), b (ISO) and c (X) are all determined so that a large weight is acquired in the case of the condition where the noise amount increases, and a small weight is acquired in the case of the condition where the noise amount decreases.

If the function f (N, ISO, X, Y) can be used, it is not necessary to store the table of a plurality of correspondences in the memory of the noise characteristic evaluating unit 401 in advance. Therefore, the memory usage of the noise characteristic evaluating unit 401 can be decreased, and the effect of reducing hardware load can be expected. By inputting the information acquired in S501 to S503 in FIG. 5 to the function f (N, ISO, X, Y), the function to indicate the correlation between the pixel value of the CG image and the noise addition amount is uniquely determined.

The noise addition amount calculating unit 402 in FIG. 4 determines the noise amount (noise addition amount) to be added to each pixel of each frame image of the CG image, in accordance with the correlation determined by the noise characteristic evaluating unit 401. The noise amount changes over time. In Embodiment 1, it is assumed that the noise amount indicated by the ordinate of the graphs in FIGS. 6A and 6B, is determined for each pixel value Y indicated by the abscissa of the graphs, and this noise measurement is a standard deviation σ(Y) of the noise amount which changes over time. For example, the noise addition amount calculated by the above mentioned function f (N, ISO, X, Y) is also the standard deviation σ(Y). For each pixel of the CG image outputted from the CG image generation unit 105, the noise addition amount calculating unit 402 calculates a noise amount σ'(Y) from the noise amount σ(Y) corresponding to the pixel value Y of the CG image and a random function RAND, using the following Expression 1. The random function RAND is a function to randomly determine a value according to a normal distribution. By using Expression 1, a random noise amount, reflecting the correlation determined by the noise characteristic evaluating unit 401, can be determined for each pixel of the CG image. The random function RAND may be a function to randomly determine a value according to a distribution that is different from the normal distribution. It is preferable that the function to be used as the random function RAND is determined considering the noise characteristic of the real space image.

$$\sigma'(Y)=\sigma(Y)\times RAND \quad \text{(Expression 1)}$$

The noise addition processing unit 403 adds the noise amount σ'(Y) determined by the noise addition amount calculating unit 402 to the pixel value Y of each pixel of the CG image outputted from the CG image generating unit 105 using the following Expression 2, and acquires a pixel value Y' of each pixel of the CG image after the noise is added.

$$Y'=Y+\sigma'(Y)=Y+\sigma(Y)\times RAND \quad \text{(Expression 2)}$$

As described above, the noise equivalent to that of the real space image can be added to the CG image based on various information related to the noise of the real space image notified from the system control unit 205 of the imaging unit 111. Then the CG image, after the noise is added, can be sent from the CG image correcting unit 106 to the display image generating unit 107, whereby the mixed reality image can be generated using the CG image in which noise equivalent to that of the real space image has been added, and be displayed on the display unit 112 of the HMD 110.

A case where the image processing setting information acquired in S502 of FIG. 5 includes digital zoom magnification setting information will be described next. The noise addition amount calculating unit 402 generates a noise image constituted of the random noise σ'(Y), and performs the magnifying processing on this noise image at a digital zoom magnification. Then the noise addition amount calculating unit 402 performs trimming processing on the magnified noise image so that the size thereof matches with the image size of the CG image, and sends the trimmed noise image to the noise addition processing unit 403. The noise addition processing unit 403 adds the noise, based on the noise image from the noise addition amount calculating unit 402, to the CG image from the CG image generating unit 105, so as to generate a CG image to which the magnified noise is added. Thereby the noise of which appearance is equivalent to the noise of the real space image magnified by the digital zoom can be added to the CG image that is superimposed on the real space image, and as a result, a mixed reality image without an unnatural sense can be acquired, even when digital zoom is used.

The above mentioned CG image correction processing (a processing series to add noise to the CG image) requires a predetermined processing time, and also requires hardware resources to implement this processing, such as sufficient memory capacity, hence results increase apparatus costs. In order to reduce this shortcoming (increase in apparatus costs), the CG image correcting unit 106 may determine whether the CG image correction processing is executed or not based on the result of measuring the noise amount of the OB region acquired in S503. In the case where the imaging unit 111 captures an image at low sensitivity, the real space image captured by the imaging unit 111 visually has no noise, therefore even if a CG image without noise is directly superimposed thereon, a mixed reality image causing almost no unnatural sense can be acquired. Hence in a case where the noise amount of the OB region acquired in S503 is smaller than a predetermined threshold, the CG image correcting unit 106 acquires an image generated by combining the CG image directly with the real space image as the mixed reality image, without performing the CG image correction processing. In a case where the noise amount of the OB region is larger than the predetermined threshold, on the other hand, the CG image correcting unit 106 performs the CG image correction processing, and then acquires the mixed reality image. Thereby the above mentioned shortcoming (increase in apparatus costs) can be minimized. In a case where the noise amount of the OB region is equal to the predetermined threshold, the CG image correction processing may be performed or may not be performed.

Embodiment 2

Figure 7:
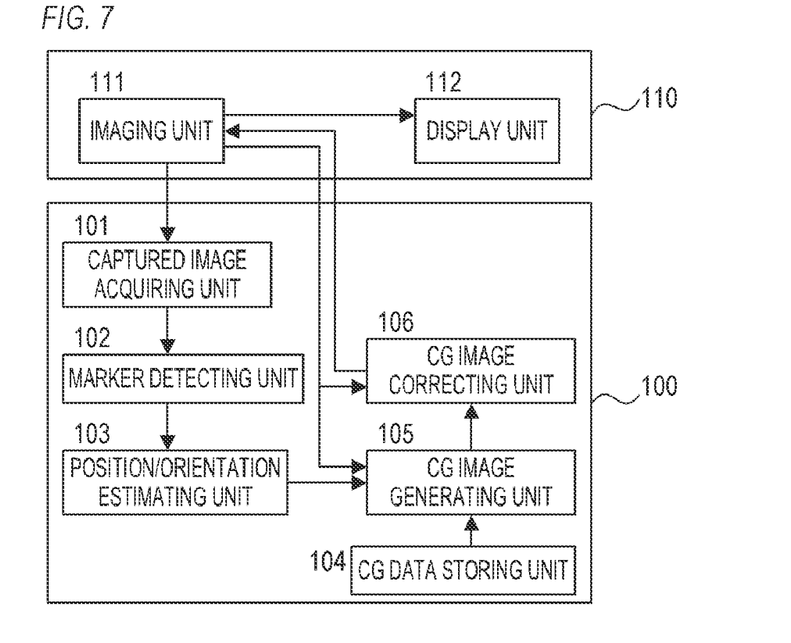
FIG. 7 is a diagram depicting a configuration example of an MR system according to Embodiment 2.

Embodiment 2 of the present invention will be described. FIG. 7 is a block diagram depicting a configuration example of an MR system, which is an information processing system according to Embodiment 2. The MR system according to Embodiment 2 does not include the display image generating unit 107 of Embodiment 1. Furthermore, unlike Embodiment 1, the imaging unit 111 generates a mixed reality image by superimposing a CG image on a real space image, and sends the mixed reality image to the display unit 112. Each of the other modules denoted with the same reference number as Embodiment 1 operates in the same manner as Embodiment 1.

Figure 8:
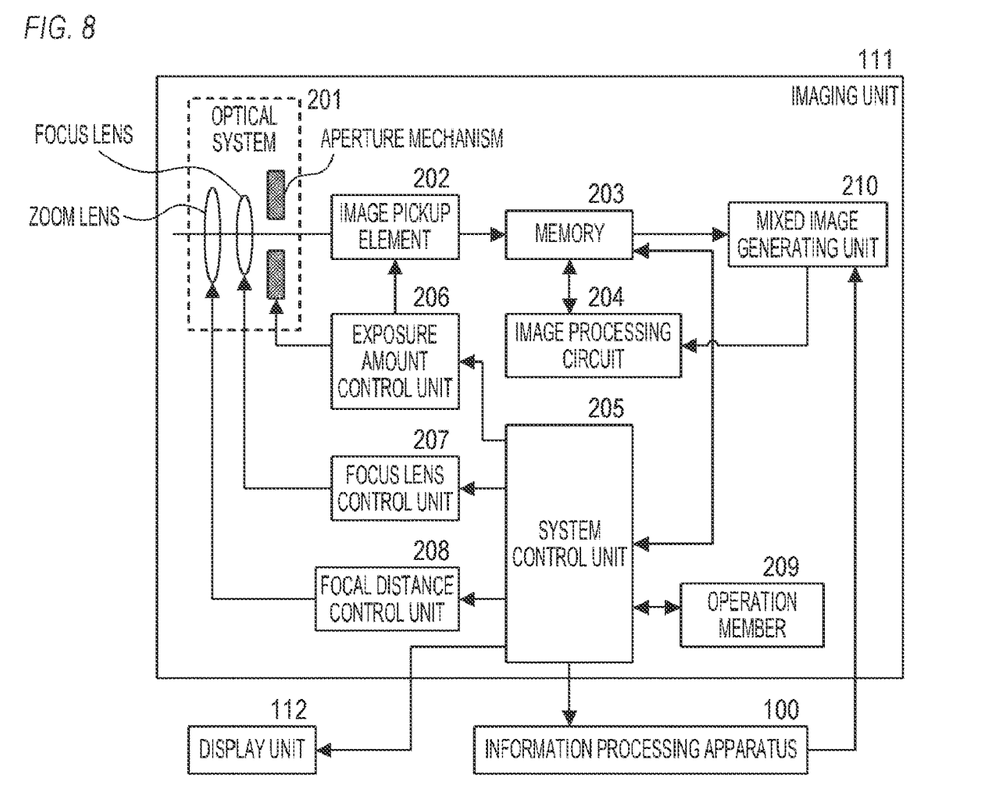
FIG. 8 is a diagram depicting a configuration example of an imaging unit according to Embodiment 2.

FIG. 8 is a block diagram depicting a configuration example of the imaging unit 111 according to Embodiment 2. Unlike Embodiment 1, the imaging unit 111 of Embodiment 2 includes a mixed image generating unit 210 which generates a mixed reality image by superimposing a CG image on a real space image. Furthermore, in Embodiment 2, the mixed reality image generated by the mixed image generating unit 210 is sent to the system control unit 205 via the image processing circuit 204, and is then sent to the display unit 112. Each of the other modules denoted with the same reference number as Embodiment 1 operates in the same manner as Embodiment 1.

An operation example of the MR system according to Embodiment 2 will be described.

First the image pickup element 202 captures an image. Thereby image data of the real space image and image data of the OB region acquired by the image pickup element 202 via the optical system 201 are held in the memory 203. Then the system control unit 205 measures the noise amount of the OB region from the image data of the OB region, and stores this measurement result (noise amount measurement result) as well in the memory 203. Then the system control unit 205 sends the image data of the real space image, the ISO sensitivity information and the noise amount measurement result to the information processing apparatus 100 without using the image processing circuit 204, or without the image processing circuit 204 performing image processing. Since the image processing by the image processing circuit 204 is not performed, the image processing setting information is not sent to the information processing apparatus 100.

Just like Embodiment 1, the information processing apparatus 100 executes operation of each model and outputs the CG image after noise is added from the CG image correcting unit 106. Here the CG image after noise is added is sent from the CG image correcting unit 106 to the imaging unit 111. Further, in the information processing apparatus 100, the noise is added to the CG image without considering the image processing setting information of the imaging unit 111. The noise added to the CG image is noise having a characteristic unique to the imaging unit 111, and is noise matching with the real space image before the image processing circuit 204 performs the image processing.

The CG image (CG image after noise is added) sent from the information processing apparatus 100 to the imaging unit 111 is sent to the mixed image generating unit 210 of the imaging unit 111. The mixed image generating unit 210 superimposes this CG image on the real space image held in the memory 203, so as to generate a mixed reality image. Here a mixed reality image is generated by superimposing the CG image on the real space image in a state before the image processing by the image processing circuit 204 is performed.

The image data of the mixed reality image generated by the mixed image generating unit 210 is sent to the image processing circuit 204, where the image processing based on the user instruction is performed. Then the system control unit 205 sends the image data after the image processing to the display unit 112, and displays the mixed reality image on the display unit 112.

As described above, according to Embodiment 2, the mixed reality image is generated using the CG image to which a noise equivalent to that of the real space image has been added, before image processing, then the image processing is performed on this mixed reality image. Thereby a mixed reality image without an unnatural sense can be acquired, even if the image processing setting information is not used when noise is added to the CG image.

The above mentioned embodiments (including modifications thereof) are merely examples, and configurations acquired by suitably modifying or changing the above mentioned configurations within the scope of the spirit of the invention are also included in the present invention. Further, configurations acquired by suitably combining the above mentioned configurations are also included in the present invention.

According to the present disclosure, an image of a virtual space having the sense of noise matching with that of the image of the real space can be acquired, and an image having no unnatural sense of noise can be acquired when an image of a virtual space is superimposed on an image of a real space.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to embodiments, it is to be understood that the invention is not limited to the disclosed embodiments. The scope of the following claims is to be accorded the broadest interpretation so as to encompass all such modifications and equivalent structures and functions.

This application claims the benefit of Japanese Patent Application No. 2021-204056, filed on Dec. 16, 2021, which is hereby incorporated by reference herein in its entirety.

What is claimed is:

1. An information processing apparatus comprising:
a processor; and
a memory storing a program which, when executed by the processor, causes the information processing apparatus to:
  execute generating processing to generate an image of a virtual space that is superimposed on an image of a real space captured by an image sensor;
  execute determining processing to determine a correspondence between a pixel value of the image of the virtual space and a noise amount to be added to the pixel value; and
  execute adding processing to add noise to the image of the virtual space in accordance with the correspondence, wherein
  the image sensor includes a region for capturing an image of the real space and a light-shielding region,
  a plurality of correspondences between the pixel value and the noise amount are determined in advance, and
  in the determining processing, any one of the plurality of correspondences is selected based on an image acquired in the light-shielding region.

2. The information processing apparatus according to claim 1, wherein
  in the determining processing, any one of the plurality of correspondences is selected based on the image acquired in the light-shielding region and on image processing that is performed on the image of the real space.

3. The information processing apparatus according to claim 2, wherein
  the image processing is at least one of noise reduction, edge enhancement, and contrast adjustment.

4. The information processing apparatus according to claim 1, wherein
  in the determining processing, any one of the plurality of correspondences is selected based on the image acquired in the light-shielding region and temperature of the image sensor.

5. The information processing apparatus according to claim 1, wherein
  in a case where magnifying processing is performed on the image of the real space, in the adding processing, noise is increased at a magnification the same as that used for the magnifying processing and the noise is added to the image of the virtual space.

6. The information processing apparatus according to claim 1, wherein
  in a case where a noise amount determined from the image acquired in the light-shielding region is smaller than a threshold, noise is not added to the image of the virtual space in the adding processing, and
  in a case where the noise amount determined from the image acquired in the light-shielding region is larger than the threshold, noise is added to the image of the virtual space in the adding processing.

7. A control method of an information processing apparatus, comprising:
  generating an image of a virtual space that is superimposed on an image of a real space captured by an image sensor;
  determining a correspondence between a pixel value of the image of the virtual space and a noise amount to be added to the pixel value; and
  adding noise to the image of the virtual space in accordance with the correspondence, wherein
  the image sensor includes a region for capturing an image of the real space and a light-shielding region,
  a plurality of correspondences between the pixel value and the noise amount are determined in advance, and
  any one of the plurality of correspondences is selected based on an image acquired in the light-shielding region.

8. A non-transitory computer readable medium that stores a program, wherein the program causes a computer to execute a control method of an information processing apparatus, the control method comprising:
  generating an image of a virtual space that is superimposed on an image of a real space captured by an image sensor;
  determining a correspondence between a pixel value of the image of the virtual space and a noise amount to be added to the pixel value; and
  adding noise to the image of the virtual space in accordance with the correspondence, wherein
  the image sensor includes a region for capturing an image of the real space and a light-shielding region,
  a plurality of correspondences between the pixel value and the noise amount are determined in advance, and
  any one of the plurality of correspondences is selected based on an image acquired in the light-shielding region.

9. A head mounted display comprising:
the information processing apparatus according to claim 1; and
a display configured to superimpose an image of a virtual space, to which noise is added, on an image of a real space, and to display.

* * * * *